United States Patent [19]
Lang

[11] 3,791,144
[45] Feb. 12, 1974

[54] REACTOR ASSEMBLY TO REDUCE AUTOMOTIVE EMISSIONS FROM AN INTERNAL COMBUSTION ENGINE

[75] Inventor: Robert J. Lang, Watchung, N.J.

[73] Assignee: Esso Research and Development Company, Linden, N.J.

[22] Filed: Mar. 31, 1972

[21] Appl. No.: 239,940

Related U.S. Application Data

[63] Continuation-in-part of Ser. No. 66,384, Aug. 24, 1970.

[52] U.S. Cl............... 60/278, 60/285, 60/301, 60/302, 60/304, 23/277 C, 23/288 F
[51] Int. Cl............... F02b 75/10, F01n 3/10
[58] Field of Search..... 60/274, 278, 301, 302, 303, 60/304, 305, 306, 284, 285, 286; 23/277 C, 288 F; 181/40

[56] References Cited
UNITED STATES PATENTS

| | | | |
|---|---|---|---|
| 2,706,012 | 4/1955 | Chipley | 181/40 |
| 3,174,277 | 3/1965 | Hettich | 60/303 |
| 1,793,813 | 2/1931 | MacKinnon | 60/302 |
| 3,066,755 | 12/1962 | Diehl | 60/303 |
| R25,576 | 5/1964 | Cornelius | 60/301 |
| 3,172,251 | 3/1965 | Johnson | 60/278 |
| 3,406,515 | 10/1968 | Behrens | 60/305 |
| 3,438,198 | 4/1969 | Bentele | 60/306 |
| 3,468,124 | 9/1969 | Hraboweckyj | 60/306 |
| 3,577,728 | 5/1971 | Brimer | 60/286 |
| 3,641,767 | 2/1972 | Kraus | 60/274 |
| 3,662,541 | 5/1972 | Sawada | 60/305 |

FOREIGN PATENTS OR APPLICATIONS

| | | | |
|---|---|---|---|
| 859,428 | 1/1961 | Great Britain | 60/323 |
| 411,655 | 6/1934 | Great Britain | 60/302 |

Primary Examiner—Douglas Hart

[57] ABSTRACT

The level of contaminants in exhaust gases emitted from the exhaust ports of an internal combustion engine is markedly reduced by mixing the exhaust gases with air, oxidizing carbon monoxide and hydrocarbons in the mixture in the area adjacent to the exhaust ports during start-up and oxidizing the carbon monoxide and hydrocarbons in a reactor when normal operating temperatures are reached. Flameholders are utilized in each exhaust port of the engine to speed warm-up and lower emissions. A further refinement is the recycle of cooled exhaust gases under certain operating conditions. The reactor is preferentially of the type comprising a generally annular or circular combustion chamber, with exhaust inlet means disposed to tangentially introduce the exhaust gases into the combustion chamber and also containing exhaust outlet means positioned and proportioned relative to the inlet means so that the exhaust gases leaving the reactor through the outlet means are substantially completely combusted. A further refinement is the utilization of nitrogen oxides reducing catalyst means located upstream of the reactor for reducing the level of nitrogen oxides in the exhaust gases prior to combustion thereof in the reactor.

23 Claims, 9 Drawing Figures

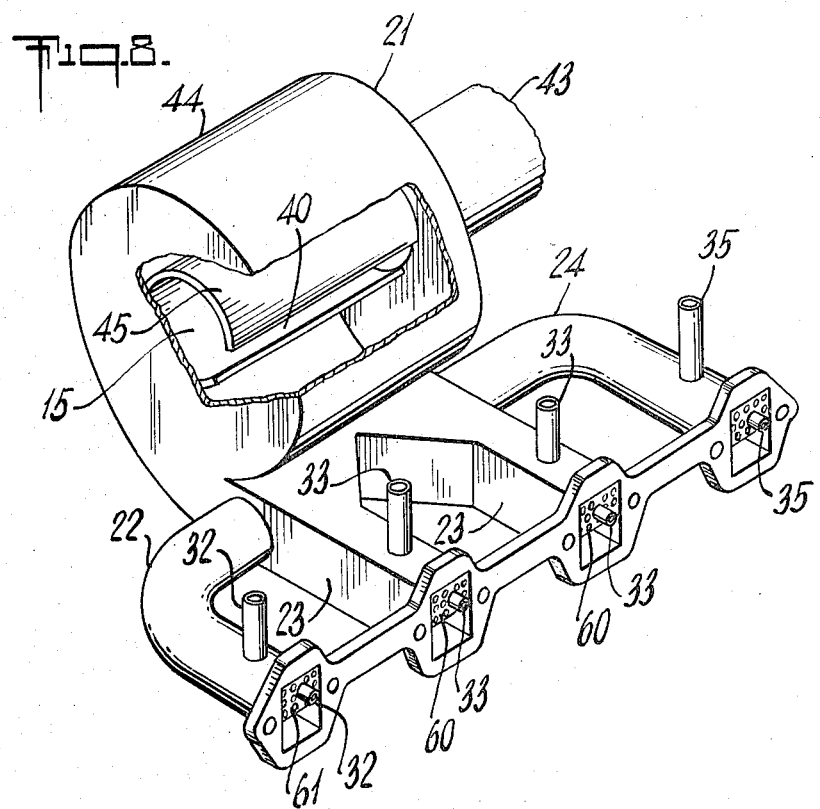
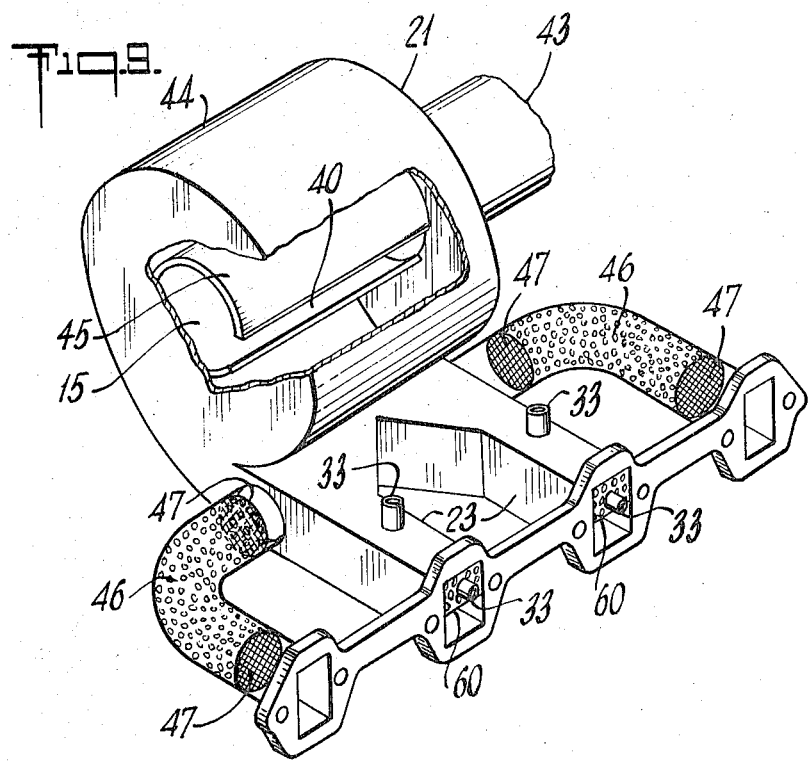

REACTOR ASSEMBLY TO REDUCE AUTOMOTIVE EMISSIONS FROM AN INTERNAL COMBUSTION ENGINE

This application is a continuation-in-part of my copending application Ser. No. 66,384, filed Aug. 24, 1970, and entitled "Reactor Assembly to Reduce Automotive Emissions from an Internal Combustion Engine."

The major gaseous atmospheric pollutants from automobile engines include carbon monoxide, unburned hydrocarbons and oxides of nitrogen. Carbon monoxide is harmful for its toxic properties and the oxides of nitrogen are also physiologically harmful. Hydrocarbons and oxides of nitrogen are additionally harmful since they participate in a sequence of photochemical reactions leading to a visibility-reducing smog which causes respiratory distress, eye irritation and crop damage. These problems become acute in urban areas where local meteorological conditions prevent the normal upward corrective movement of ground level air for long time periods.

The present invention is concerned with a low polluting internal combustion engine whereby objectionable compounds such as carbon monoxide, unburned hydrocarbons and nitrogen oxides are minimized in the exhaust gases. These objects are obtained by the utilization of a reactor assembly wherein the carbon monoxide and hydrocarbons are oxidized. Nitrogen oxides are minimized by means of exhaust gases which are recycled to the engine and by operating the engine fuel-rich.

Carbon monoxide and hydrocarbons in automobile exhaust result from incomplete combustion of the fuel due to lack of oxygen, lack of time required to complete the combustion, or cooling and quenching of the combustion reactions. Since the combustion reaction in an engine is contained and the containing wall must be cooled to protect the metal wall, the incomplete combustion is inevitable in the cylinder. Therefore, an afterburning reaction is required in order to maintain these two pollutants below certain levels. The oxygen for this purpose can be supplied by secondary injection of air into the exhaust. When very low levels of these pollutants are desired, rich operation of the engine provides additional fuel to achieve the temperatures required for efficient afterburning.

The nitrogen oxides are formed in the engine cylinders, especially when the flame temperature is high. Reducing the combustion temperature suppresses $NO_x$ and this can be accomplished by running the engine fuel-rich or recycling exhaust gas or both. Exhaust recycle up to about 15 percent by volume does not affect driveability and gives only a minor loss in fuel economy.

There are three major embodiments of this invention. The first embodiment relates to a novel reactor for combusting contaminants emitted from the exhaust ports of an internal combustion engine. The second embodiment relates to the combination of a $NO_x$-reducing catalyst (to lower the $NO_x$ level in the exhaust gases) and the novel reactor. The third embodiment relates to the combination of combustion stabilizing means (to stabilize combustion of the exhaust gases in the vicinity of the exhaust ports) and a reactor for combusting contaminants (the reactor may be any suitable type of prior art thermal reactor or the novel reactor disclosed herein). Preferably there are also included means for introducing air to the exhaust ports to mix with the exhaust gases prior to combustion in the reactor.

Referring to the first embodiment, the novel reactor comprises wall means defining a generally annular combustion chamber having inner and outer boundaries, exhaust inlet means defined in the wall means comprising the outer boundary of said chamber, said inlet means being disposed to tangentially introduce said air-exhaust gases mixture into said combustion chamber, and exhaust outlet means defined in the wall means comprising the inner boundary of said chamber, said exhaust outlet being positioned and proportioned relative to said inlet means so that the exhaust gases leaving the reactor through said exhaust outlet means are substantially completely combusted.

The novel reactor will be more clearly understood by reference to the following drawings.

FIG. 8 is a perspective view which shows in some detail the preferred type of configuration of the novel reactor.

FIG. 9 is the same view as in FIG. 8, but includes the feature of a reducing catalyst in combination with the preferred reactor.

Figure 1:
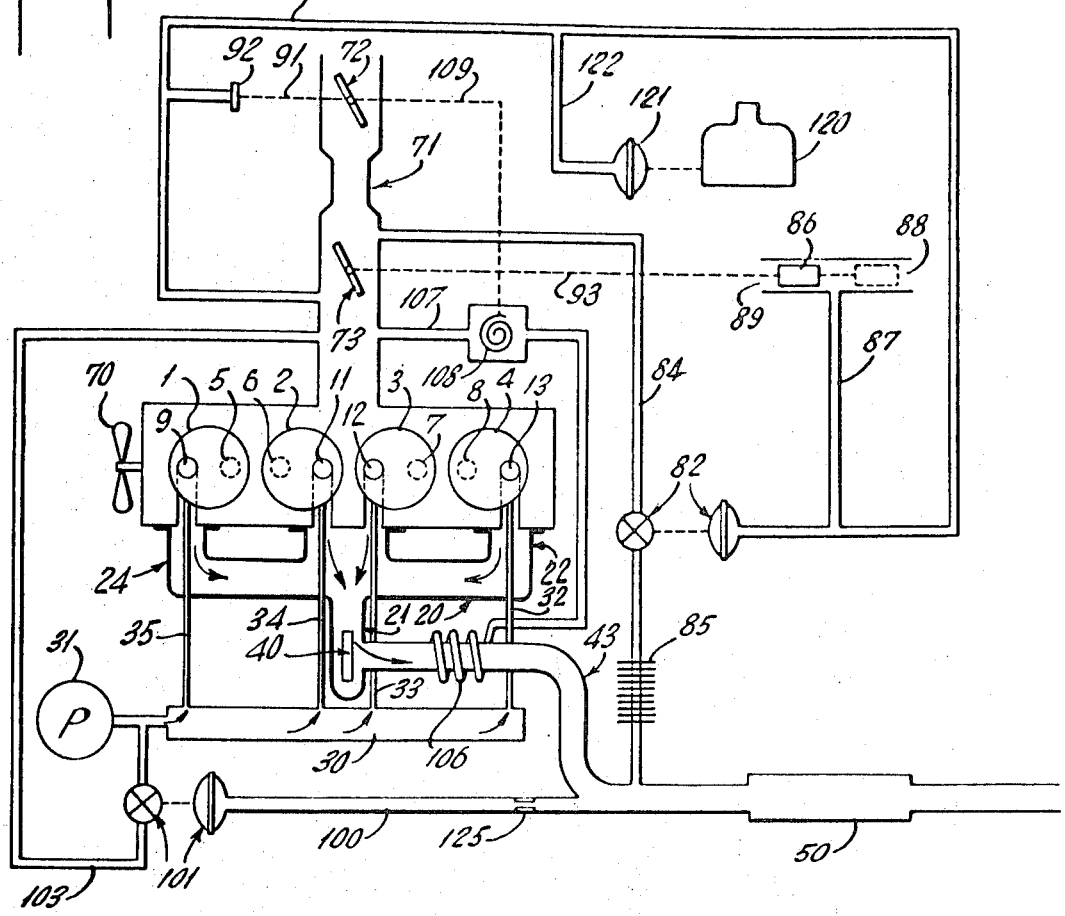
FIG. 1 is a schematic representation of an internal combustion engine in accordance with this invention.

Referring specifically to FIG. 1, an internal combustion engine is shown illustrating a bank of four cylinders 1, 2, 3 and 4. The intake ports of cylinders 1, 2, 3 and 4 are 5, 6, 7 and 8, respectively, while the exhaust ports are 9, 11, 12 and 13, respectively.

The novel reactor 20 comprising wall means defining a generally annular combustion chamber 21 is in communication with exhaust port 9 through left connection arm 24, with exhaust ports 11 and 12 through center connecting arm 23 (shown in FIG. 2) and with exhaust port 13 through right connecting arm 22. If desired, central connecting arm 23 (which serves two exhaust ports) may be present as two central connecting arms 23 as shown in FIGS. 8 and 9, thus having a single connecting arm serving each cylinder.

For other engines having fewer or more cylinders, appropriate changes in the size and number of reactors and connecting arms would be made, depending on the number, size and configuration of the cylinders.

Also shown in FIG. 1 is an air manifold 30 in which air is maintained at a desired pressure by means of pump 31. An air line 32 extends from manifold 30 to exhaust port 13, an air line 33 extends from manifold 30 to exhaust port 12, and air line 34 extends from the air manifold 30 to exhaust port 11, while an air line 35 extends from the air manifold 30 to exhaust port 9.

FIG. 1 also shows a conventional cooling fan 70, a conventional carburetor 71 wherein conventional means, not shown, are utilized for the introduction of the fuel, a conventional choke valve 72 and a conventional throttle valve 73. A particular feature of the present invention is the utilization of a flameholder 60 positioned in center arm 23, a flameholder 61 positioned in connecting arm 22 and a flameholder 62 positioned in connecting arm 24. The flameholders ("combustion stabilizing means") and their mode of operation will be described hereinbelow with reference to the third embodiment of this invention.

In operation, when the exhaust valves 9, 11, 12 and 13 open, the exhaust gases will be mixed with additional air introduced into each exhaust port by means of lines 35, 34, 33 and 32, respectively. The resultant air-exhaust gas mixtures then move through the connecting arms and are tangentially introduced through the exhaust inlet portion of the reactor into the combustion chamber 21 of the reactor. The air-exhaust mixture moves circumferentially within, and is combusted in chamber 21. Exhaust outlet 40 is proportioned and positioned within the inner wall of chamber 21 such that the exhaust gases leaving the reactor through outlet 40 have already been substantially combusted. From outlet 40, the substantially combusted exhaust gases flow into central plenum chamber 15 and thence through conduit 43 into exhaust muffler 50.

A particular feature of the present invention is the recycle of exhaust gases to a point between throttle valve 73 and the introduction of the fuel mixture under controlled conditions. When the engine is operating, vacuum (i.e. reduced pressure) generated in the intake manifold, is transmitted through line 81 to a diaphragm positioned in diaphragm valve 82. This will open valve 82 which is spring loaded to close when no vacuum is exerted on the diaphragm. Thus, when the engine is operating, a vacuum will be exerted on the diaphragm in valve 82 which will hold it in the open position permitting recycle of exhaust gases through line 84. A feature of the recycle operation is to cool these gases by means of a finned cooler 85. When the throttle valve 73 is intermediate between full throttle and idle throttle, valve 86, which is activated by throttle valve 73 by connecting means 93, will be in an intermediate position to seal off line 87 and prevent any bleeding of atmospheric air to the diaphragm of valve 82, which otherwise would permit valve 82 to close.

However, when throttle valve 73 is open at full throttle, valve 86 will be in the position shown, permitting air to bleed through port 88, through line 87 and thus prevent any vacuum to be exerted on the diaphragm in valve 82, which thus will close, preventing any recycle of exhaust gases through line 84.

When throttle valve 73 is closed in the idle position, valve 86 will be in the position shown in dotted lines, thus permitting air to bleed through port 89, through line 87 and prevent any vacuum on the diaphragm in valve 82, thus permitting speing loaded valve 82 to close. Thus, recycle of exhaust gases is secured only when throttle valve 73 is intermediate between full throttle and idle throttle.

A further feature of the present invention is to not recycle exhaust gases when choke valve 72 is closed. When choke valve 72 is closed, connecting means 91 will cause valve 92 to open, thus allowing air to be bled, through line 81, to diaphragm in valve 82 which permits it to close. Thus, exhaust gases will not be recycled when the choke is closed and only when the throttle valve 73 is intermediate the full throttle and idle throttle.

A further feature of the present invention is a means to prevent excessively high temperatures in reactor 21 when continuously running at high speeds. At high speeds, the flow of exhaust gas is high and the pressure upstream of muffler 50 is increased. This pressure is transmitted through line 100 to the diaphragm in diaphragm valve 101, which diaphragm will function to open the valve, permitting air to be diverted from pump 31 through line 103 to the intake manifold, thus leaning out the engine and reducing the reactor temperature. A restriction 125, in line 100, imposes a time delay on the transmission of pressure to valve 101, thus permitting short periods of high speed operation without diverting air from the reactor.

Another feature of the present invention is the regulation of reactor temperature in driving modes other than high speed. Reactor temperature is sensed by the bimetallic thermal element 108 which is heated by air drawn through coil 106 which is in close proximity to reactor 21. The heated air is drawn across thermal element 108 through line 107 by means of the intake manifold vacuum. The heating of bimetallic element 108 opens choke valve 72 by means of linkage 109 leaning out the engine and reducing the reactor temperature. When the temperature of reactor 21 decreases, the air from coil 106 is decreased in temperature and element 108 is cooled, thus closing choke valve 72, providing a mixture richer in fuel which tends to increase the reactor temperature.

A further aspect of the reactor temperature control in concerned with vacuum spark advance. The vacuum spark advance 121 is controlled by the choke recycle air bleed lines so that no vacuum advance is obtained when the choke is closed. When the choke is closed, valve 92 is open bleeding air into lines 81 and 122. Under these conditions, the vacuum spark advance mechanism 121 is not activated in distributor 120. This helps in securing consistently good reactor warmup by increasing the exhaust temperature.

A further refinement of the exhaust gas recycle system in FIG. 1 is the use of a finned tube 85 to cool the recycled exhaust gas. The cooled exhaust gas is preferably introduced into the carburetor above the throttle valve 73, but downstream of where the fuel is injected. A volume of recycle gas in the range of about 8 to 20 percent by volume, such as about 12 percent, is used based upon the total air flow to the engine; this amount generally suppresses the nitrogen oxide formation without significantly impairing engine performance. As pointed out, the diaphragm valve 82, opened by intake manifold vacuum, is used to control the recycle. Air bleeds to the diaphragm, which are controlled by throttle and choke position, shut off the recycle when the throttle valve is in the idle or full throttle position, or when the choke is closed. The recycle is not used at idle because the engine runs more smoothly without it and since the engine also runs fuel-rich at idle the $NO_x$ is low anyway. At full throttle, recycle is not used so that the maximum power may be derived from the engine. The recycle of exhaust gases is not needed when the engine is choked and running fuel-rich because the nitrogen oxides are low under these conditions. Also, the elimination of recycle when the engine is choked and cold speeds reactor warmup.

Figure 2:
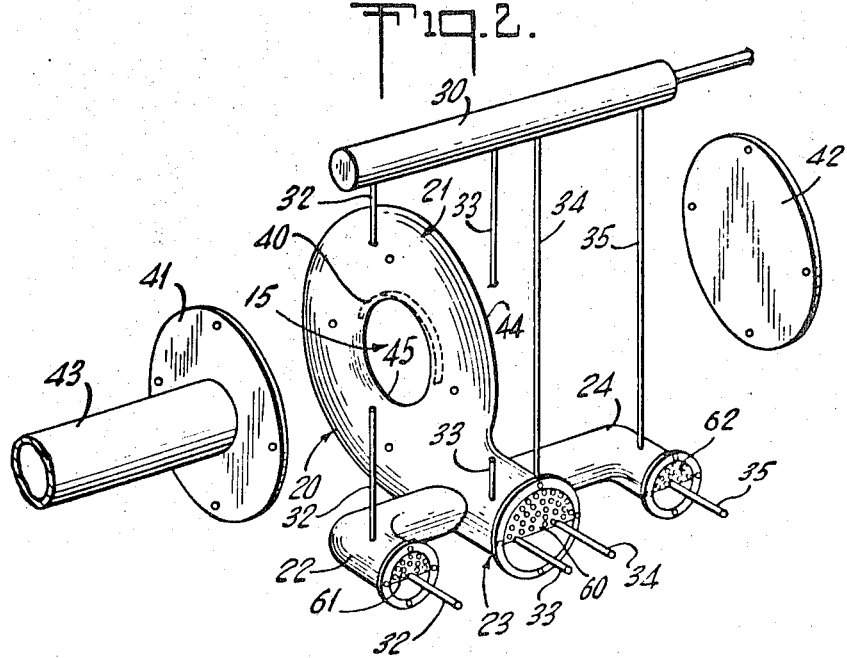
FIG. 2 is an exploded-perspective view which shows in some detail one type of configuration of the novel reactor.

Referring to FIG. 2, reactor 20 is shown with arms 22, 23 and 24. Central arm 23 serves to receive exhaust gases from exhaust ports 11 and 12 and arms 22 and 24 serve to receive exhaust gases from exhaust ports 13 and 9, respectively (the exhaust ports are shown in FIG. 1). Prior to entry into arms 22, 23 and 24, the exhaust gases are preferably admixed with air which has been introduced into the exhaust ports through lines 32, 33, 34 and 35. The resultant air-exhaust gas mixtures then flow through arms 22, 23 and 24 and are tangentially introduced into annular combustion chamber 21.

Exhaust outlet 40 is positioned within combustion chamber 21 and proportioned relative to the inlet of chamber 21 such that the air-exhaust gas mixture in the chamber is substantially completely combusted prior to exit through outlet 40. It is preferable to further position and proportion outlet 40 such that a portion of the products of the combustion within chamber 21 flows circumferentially within the chamber to mix with fresh quantities of air-exhaust gas mixture intorduced into the chamber.

The substantially completely combusted exhaust gases exit through outlet 40 into the plenum chamber defined by endplates 41 and 42. The substantially combusted exhaust gases then flow out to the atmosphere through axial tube 43 (a muffler 50 may be interposed between tube 43 and the atmosphere, as shown in FIG. 1).

In view of the heat generated by the combustion reaction within chamber 21, it is desirable that the entire assembly in FIG. 2 (and exhaust tubes) be insulated. Such insulation will keep the engine compartment cooler and will diminish heat being transmitted to the floorboards of the vehicle and will be helpful in maintaining the proper temperature range of combustion. Insulation of tube 43 is also preferred inasmuch as a minor amount of combustion may also take place therein.

Figure 3:
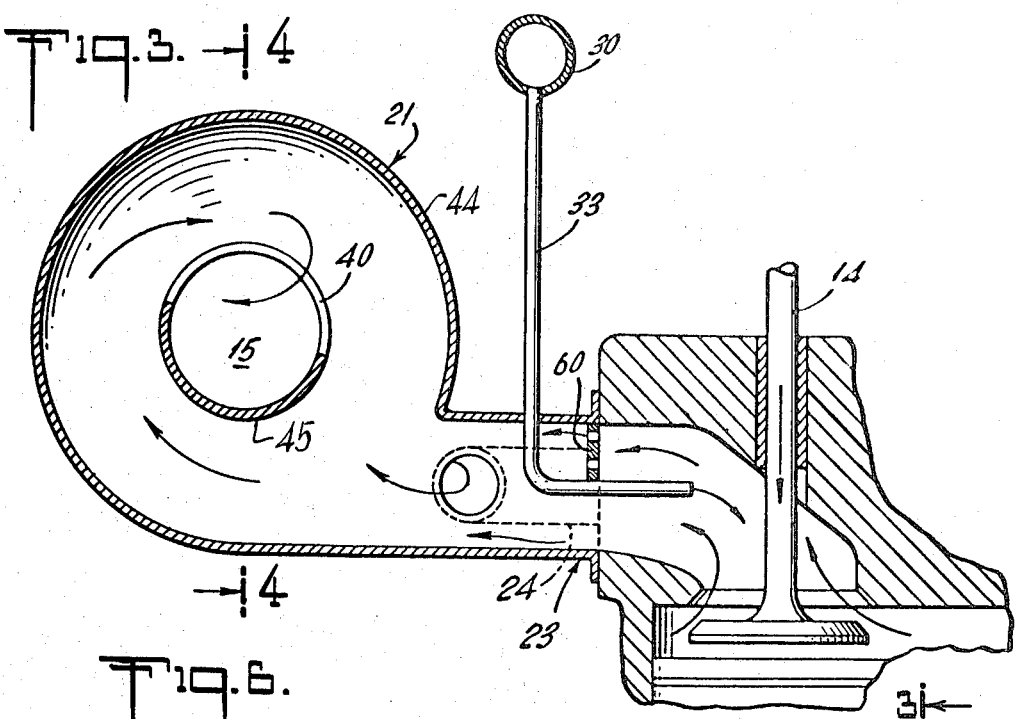
FIG. 3 is a cross-sectional view, taken along the lines 3—3 of FIG. 4, showing the orientation of the novel reactor as attached to the engine.
Figure 4:
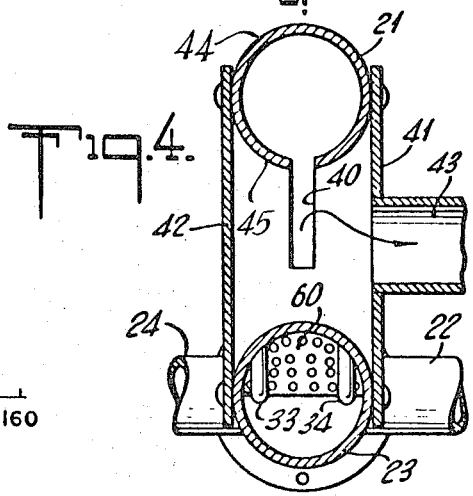
FIG. 4 is a cross-section view, taken along the lines 4—4 of FIG. 3, of the novel reactor.

FIGS. 3 and 4 are somewhat different views of the assembly shown in FIG. 2. FIG. 3 shows the exhaust gases flowing past a typical exhaust valve 14, admixed with air, entering combustion chamber 21 and being substantially combusted therein and exiting through outlet 40 into plenum 15 and then into axial tube 43.

Figure 5:
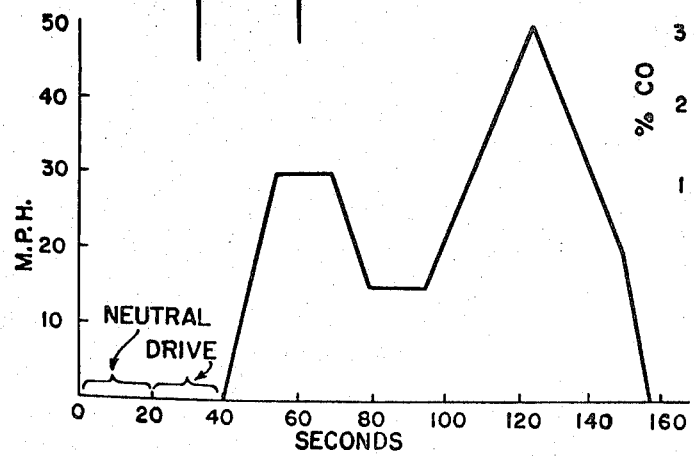

FIG. 5 shows the first driving cycle of the United States Federal Procedure (used prior to 1972) for measuring automotive emissions. Seven similar cycles constitute a complete test.

Figure 6:
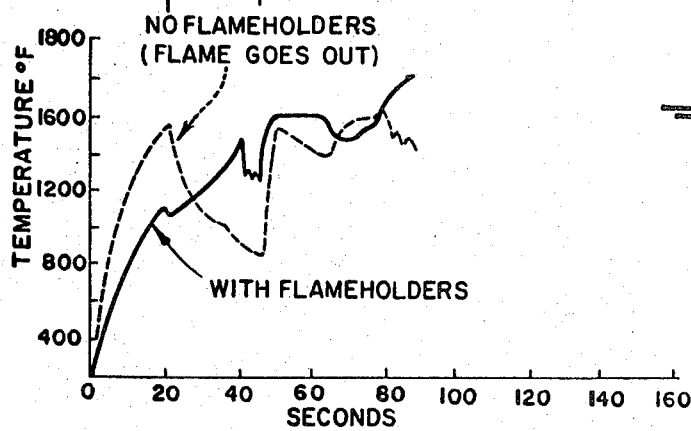
FIGS. 5, 6 and 7 are graphs which illustrate the effectiveness of the novel reactor shown in FIG. 2.

FIG. 6 shows how the combustion stabilizing means (i.e. "flameholders," discussed in greater detail hereinbelow) 60, 61 and 62 keep the combustion from being extinguished during the first cycle of the Federal Emissions Test Procedure which is shown in FIG. 5, thus reducing emissions and reactor warmup time.

Figure 7:
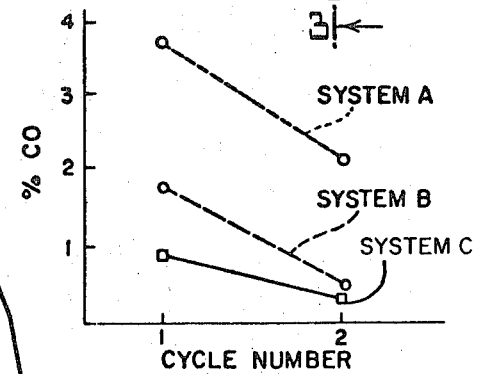

FIG. 7 shows that the novel reactor warms faster and gives lower emissions than other thermal reactors in the first two driving cycles of the Federal Test Procedure. This FIG. 7 compares the warmup of the novel reactor with other known thermal reactor assemblies. The prior art reactor "System A" is a cylindrical reactor with poorer mixing than the novel reactor; reactor "System B" is the novel reactor without flameholders; and "System C" is the novel reactor with flameholders. It can be seen that the novel reactor with flameholders gives lower emissions than both of these assemblies in the first two cold cycles.

FIG. 8 depicts the preferred configuration of the novel reactor. The parts having like function and purpose are designated with reference numerals identical to those employed in FIGS. 1 and 2. As shown in FIG. 8, the annular combustion chamber 21 has a generally cylindrical configuration and the exhaust outlet 40 leading to plenum 15 is positioned in inner wall 45 and proportioned relative to the exhaust inlet of chamber 21 such that the exhaust gases are substantially completely combusted prior to exit through outlet 40. The generally cylindrical-shaped reactor of FIG. 8 functions in the same manner heretofore described with respect to the "doughnut" configuration.

The generally cylindrical-shaped reactor has several advantages over that of the "doughnut"-shaped reactor of FIGS. 1 and 2: (a) the generally cylindrical-shaped reactor may be more economically fabricated; (b) though of approximately the same volume, the generally cylindrical-shaped reactor has a substantially lower surface: volume ratio, i.e. there will be less metal to heat up and also smaller heat losses; (c) the effluent from the generally cylindrical-shaped reactor will be more uniform and more completely combusted since this shape permits placement of a relatively narrow exhaust outlet about 270° from the inlet (versus an outlet commencing about 180° and extending to about 270° from the inlet in the "doughnut"-shaped reactor).

FIG. 9 relates to the second embodiment of this invention, i.e. the combination of $NO_x$-reducing catalyst and reactor. The $NO_x$-reducing catalyst is placed upstream of the reactor (which may be any type reactor including the novel reactors of this invention). All the exhaust gases may be passed through the catalyst, but for faster reactor warm-up, only part of the exhaust gases flowing from the exhaust ports is exposed to the catalyst, since the exhaust gases may be cooled during contact with the catalyst and may thus not initially be self-combusting in the reactor (thus necessitating the use of additional devices such as glow plugs, hot wires, spark plugs, etc. to initially maintain combustion in the reactor).

Referring specifically to FIG. 9, the differences thereof between FIG. 8 are the catalyst 46 and catalyst-retaining screens 47 in the outer left- and right-connecting arms, with the reactor, center arms and the parts thereof being the same as in FIG. 8. Further, since the catalyst is a reducing catalyst designed to convert nitrogen oxides to nitrogen, it is preferable that air not be introduced into the catalyst bed(s) and that combustion (i.e. oxidation) not be permitted to take place therein; for this reason, air lines 32 and 35 and combustion stabilizing means 61 and 62 are preferably eliminated from the left- and right-connecting arms. In the case where all of the exhaust gases are exposed to the catalyst (e.g., each arm contains catalyst), the air required for combustion may be injected directly into the reactor.

The reducing catalyst (about 250 cc. in each of the two arms is adequate) may be any material which has the capacity for reducing oxides of nitrogen. Examples of such catalysts include supported and unsupported metals and metallic compounds, such as monel, copper chromite, platinum/aluminum oxide, vanadia/aluminum oxide, promoted nickel and/or iron, rubidium, palladium, rhenium, titanium, ruthenium, iridium, etc.

The third embodiment of this invention comprises: (a) means for introducing air to said exhaust ports to mix with said exhaust gases; (b) combustion stabilizing means, separate and independent of said air introduction means, and located adjacent to said exhaust ports and entirely downstream of said air introduction means, for stabilizing any combustion of the air-exhaust gas mixture which occurs in the region of said exhaust ports, thereby providing, during said warm-up period, reduced levels of unburned contaminants emitted into the atmosphere and rapid warm-up of reactor means located downstream of said combustion stabilizing means; and (c) reactor means, located downstream of said combustion stabilizing means, for combusting any uncombusted air-exhaust gas mixture.

The combustion stabilizing means ("flameholders") are especially useful in conjunction with an internal combustion engine containing a fuel enrichment device, e.g., conventional choke. During the warm-up cycle of the engine the engine makes use of a high fuel-air ratio and exhaust gas combustion takes place primarily at the combustion stabilizing means, rather than in the reactor (primarily since the reactor walls have not yet reached a sufficient temperature to sustain combustion therein). By the time the engine has reached normal operating temperature, the fuel enrichment device will no longer be operational and combustion will take place in the reactor downstream of the combustion stabilizing means. The reactor, in this third embodiment, may be any type of thermal reactor (including prior art reactors), but is preferably the novel reactor of this invention (especially the "cylinder" type shown in FIG. 8).

Referring to FIGS. 2 and 8, before the exhaust gas enters the combustion chamber 21, sufficient air is injected by means of lines 32, 33, 34 and 35 to burn the carbon monoxide and hydrocarbons completely. The air is best injected into the vicinity of the exhaust valve and port. When the engine is choked during startup, combustion of the carbon monoxide and hydrocarbons will actually begin in the exhaust port just downstream of the exhaust valve. This is desirable since it speeds reactor warmup and reduces emissions at the same time. However, the flame in the exhaust port is unstable and tends to blow out easily. The flame-holders 61, 60 and 62) located adjacent to the exhaust ports, see FIG. 2), prevent this by stabilizing the combustion in this region until the reactor gets hot and the choke comes off. During unchoked operation, the flame is held in the toroidal reactor. The flameholders comprise, for example, 1/16 inch stainless sheet punched with ⅛ inch holes to give about 30 to 50 percent, such as about 40 percent open area and extend partially across, e.g., about halfway across the exhaust passage. Any other shape of flameholder which would establish a recirculation zone for the gases in the vicinity of the exhaust port could be used if it did not impose too much backpressure on the engine.

Referring again to FIGS. 2 and 8, the dimensions of the assembly of the present invention may be varied appreciably, depending upon the particular engine, engine operating conditions and other environmental factors. The plane of the combustion chamber, for example, may be tilted or rotated with respect to the connecting arms to achieve the best fit within the engine compartment. Also, the entire assembly is preferably adequately insulated to prevent heat losses which would tend to slow down the afterburning reactions and overheat the engine compartment. The cross-section of the circumferential passageway of the combustion chamber need not be circular but any convenient shape such as square, rectangular, or elliptical.

One satisfactory assembly for a 307 cubic inch displacement engine comprises an 8 inch O.D. torus of 2 inch O.D. stainless steel tubing. The exhaust from the engine enters combustion chamber 21 tangentially and leaves through a circumferential aperture 40 towards the center into a plenum 15 formed by plates 41 and 42.

The aperture 40 is desirably positioned within combustion chamber 21 such that the unburned hydrocarbons and carbon monoxide (present in the air-exhaust gas mixture) are substantially completely oxidized by the time that the air-exhaust gas mixture reaches aperture 40 and preferably further positioned so that at least a portion of the products of the oxidation reaction flows circumferentially within a chamber 21 to mix with fresh quantities of air-exhaust gas mixture being introduced into the chamber, with the remainder of the products of the combustion reaction flowing through aperture 40 to the plenum 15 through an axial tube 43 which leads to the muffler 50.

Those skilled in the art may readily determine the most desirable position of aperture 40 within chamber 21, keeping in mind the requirements of such positioning as set forth immediatley hereinabove. Within the framework of such requirements, the actual positioning of the aperture may vary markedly, depending on the circumference and cross-sectional area of the torus, level of unburned hydrocarbons and carbon monoxide in the air-exhaust gas mixture, volume of mixture flowing into the torus at any given moment, etc. However, in the 8 inch O.D. torus mentioned above and shown in FIG. 2, satisfactory reduction of pollutants was achieved with the beginning of aperture 40 located about halfway around from the entrance of chamber 21. In this 8 inch O.D. torus, aperture 40 was in the form of a slot of about ½ inch wide and about 6 inches circumferential length.

As mentioned above, the "cylinder" type of novel reactor (as shown in FIG. 8) is preferred over the "doughnut" type of reactor (as shown in FIG. 2). The following table indicates the dimensions of suitable reactors of each type:

TABLE I

DIMENSIONS OF SUITABLE REACTORS (307 CID engine)

| | "Doughnut" Type | "Cylinder" Type |
|---|---|---|
| Torus Diameter, in. | 8 | 5.5 |
| Torus Width, in. | 2 | 3 |
| Torus Volume, in. | 73 | 71 |
| Torus Surface, in. | 122 | 96 |
| Surface/Volume Ratio | 1.66 | 1.35 |

Tables II and III below illustrate the benefits in emission reductions achieved with the "doughnut" type and "cylinder" type reactors of this invention. These results were achieved on a 1968 Chevrolet (Bel Air) with a 307 CID V-8 engine. Each bank of cylinders was equipped with a reactor which was insultated with about a ½ inch of refractory felt overlaid with asbestos cement and the exhaust pipes were insulated back to the muffler.

Air for the reactors was supplied by a single automotive air pump driven by the engine. The manifolds for conducting this secondary air to the exhaust ports were balanced to insure even distribution of the air. A pump speed of approximately 2.5 times engine speed was used, and this provided sufficient air so there was always a minimum of about 2 percent excess oxygen in the exhaust.

The exhaust gas crossover, normally used to heat the intake manifold, was blocked on one side. This was done because cross-flow tended to make one reactor operate cooler than the other. No problems were encountered in warming up the engine with this arrangement.

Basic spark timing was set at 2° BTC according to the manufacturer's specification. The vacuum spark advance was inactivated until the engine and reactors warmed up. In addition, the vacuum advance was eliminated at throttle positions below those necessary for 20–25 mph cruise. This tended to reduce $NO_x$ emissions from the engine. The vacuum advance was activated by a switch which sensed throttle position, but this throttle switch was not activated until a thermal switch on the exhaust pipe indicated that the system was hot.

Exhaust gas recycle (EGR) was used for maximum $NO_x$ control. The amount used was approximately 12 percent based on engine intake air. It was taken in the vicinity of the muffler, passed through finned tubing to cool it, and introduced into the carburetor above the throttle plates. An on-off vacuum operated diaphragm valve was used to control the recycle. This valve was tied in to the vacuum spark advance line so that the recycle was off when the vacuum spark advance was off. EGR was not used at throttle positions below 20–25 mph cruise because it increased CO and hydrocarbon emissions. It was not used during warm-up because it prevented a flame from being established quickly. The use of EGR resulted in about a 50 percent decrease in $NO_x$ emissions from the level achieved by operating the engine fuel-rich.

Choke operation is an extremely important factor in achieving low emissions because of its influence on reactor warm-up. In optimizing choke operation, a balance must be struck between the rate of warm-up and the emissions discharged during this period. If the choke is set too rich, warm-up is fast but the initial CO emissions are too high. If the choke is set too lean, the CO is lower initially, but reactor warm-up is slower and the emissions continue too long.

In much of the experimental work, the choke was operated manually. An automatic choke was developed, however, which works as well. It disengages thermally in response to reactor exhaust temperature and is fully open after about 100–150 seconds. A mechanical linkage between the choke and throttle overrides the thermal control. It opens the choke as a function of throttle position during accelerations, and results in reduced CO and hydrocarbon emissions during warm-up. The fast idle cam was also modified. It provides a fast idle speed of 1,700–1,900 RPM in neutral after starting, but the first throttle movement disengages the cam completely and returns the idle speed to normal. The initial fast idle helps warm the reactors up quickly.

In order to provide the CO and hydrocarbons necessary for combustion in the reactors, the carburetor was modified to deliver richer air/fuel mixtures to the engine. Mixtures, richer than necessary to sustain the reactors, were used to help suppress $NO_x$ formation in the engine by lowering peak cylinder temperature.

To achieve the desired carburetor encrichment, the idle, off-idle and main jets were enlarged. The air/fuel ratios depend on the mode of operation, but they are in the range of 10.5/1 to 12.5/1. In modifying the carburetion, an effort was made to provide the greatest enrichment during accelerations when most of the $NO_x$ is produced. Excessive enrichment was avoided, however, because the reactors got too hot during high speed operation. A balance was struck, therefore, to minimize $NO_x$ while maintaining reasonable reactor temperatures. At 60 mph cruise, the reactor temperature reached 1,950° F., which in this work, was considered an upper limit for reactor durability.

In this experimental work no overtemperature control was used. In practical use, however, it would be necessary to protect the reactors against the excessive temperatures which could be caused by malfunction. A stuck choke, for example, or persistent spark plug misfire could supply too much fuel to the reactors and cause them to overheat. One way to prevent excessive temperatures is to restrict the air pumped into the reactors. By diverting this air, instead, to the intake manifold, the engine can be leaned out, and reactor temperature lowered without emitting excessive amounts of CO and hydrocarbons.

No attempt was made to evaluate system durability in this investigation. The "doughnut" reactors were made of type 304 and type 316 stainless steel. The "cylinder" reactors were made from type 310 stainless steel 0.065 inches thick.

TABLE II

EMISSION RESULTS WTIH "DOUGHNUT" REACTOR (1972 CVS Test Procedure)

| Test No. | CO | Grams/Mile Emission Hydrocarbons | $NO_x$ |
|---|---|---|---|
| 1 | 6.4 | 0.28 | 0.90 |
| 2 | 6.0 | 0.26 | 0.88 |
| 3 | 8.8 | 0.32 | 0.95 |
| 4 | 6.9 | 0.32 | 0.90 |
| 5 | 8.2 | 0.17 | 0.79 |
| 6 | 7.0 | 0.17 | 1.01 |
| 7 | 7.2 | 0.24 | 0.88 |
| 8 | 7.8 | 0.08 | 0.90 |
| 9 | 6.0 | 0.29 | 0.84 |
| 10 | 7.2 | 0.23 | 0.73 |
| Average | 7.2 | 0.24 | 0.88 |

TABLE III

EMISSION RESULTS WITH "CYLINDER" REACTOR (1972 CVS Test Procedure)

| Test No. | CO | Grams/Mile Emission Hydrocarbons | $NO_x$ |
|---|---|---|---|
| 1 | 4.0 | 0.04 | 0.72 |
| 2 | 3.4 | 0.15 | 0.68 |
| 3 | 3.7 | 0.05 | 0.73 |
| 4 | 3.7 | 0.07 | 0.73 |
| Average | 3.7 | 0.08 | 0.72 |

With the novel reactor assembly of this invention, the $NO_x$ level desired determines how fuel-rich the engine must be operated. The lower the air-fuel ratio is the lower the nitrogen oxides production, but the higher the reactor temperatures which are reached. Adequate $NO_x$ levels can be achieved without exceeding temperatures of 1,900° F. where reactor durability is not a problem. Since the novel reactor assembly is very efficient at oxidizing carbon monoxide and hydrocarbons, it is able to operate at very low air-fuel ratios to minimize $NO_x$ and still burn up the large amounts of CO and hydrocarbons produced by the engine at these conditions. With less efficient reactors, the emissions of CO and hydrocarbons would increase if the engine were operated very rich in fuel to achieve low $NO_x$ levels.

The advantages of the present invention are that it produces lower emissions than other thermal reactor assemblies. Durability is less of a problem because of its unique design. The erosion of the reactor, which is a problem in other systems, is eliminated because the gases entering the combustion chamber do not impinge perpendicularly against the reactor wall, but at an oblique angle. The novel reactor assembly of this invention is simpler, less bulky, less expensive than other assemblies, and its performance is not affected by lead of other additives in the fuel.

The following Table IV shows how the fast warmup affects the emissions of carbon monoxide, hydrocarbons and nitrogen oxides in the four cold cycles and the two hot cycles of the Federal Procedure used prior to 1972. Also shown are the composite results which weights the cold cycles 35 percent and the hot cycles 65 percent. In the cold cycles, the carbon monoxide and hydrocarbons are reduced considerably with flame-holders and the composite results reflect this improvement. Carbon monoxide is reduced from 0.33 percent to 0.17 percent and hydrocarbons are reduced from 24 to 18 ppm in the composite.

TABLE IV

EFFECT OF FLAMEHOLDERS

| | Flameholders | % CO | HC ppm | $NO_x$ |
|---|---|---|---|---|
| Average Cold Cycles | No | 0.85 | 46 | 133 |
| | Yes | 0.48 | 30 | 129 |
| Average Hot Cycles | No | 0.06 | 9 | 147 |
| | Yes | 0.02 | 13 | 150 |
| Composite | No | 0.33 | 24 | 152 |
| | Yes | 0.17 | 18 | 142 |

What is claimed is:

1. An assembly for reducing the level of contaminants in exhaust gases emitted from the exhaust ports of an internal combustion engine containing a fuel enrichment device for increasing the fuel:air ratio in the engine during the warm-up period of the engine's operation which comprises:

a. means for introducing air to said exhaust ports to mix with said exhaust gases;

b. combustion stabilizing means comprising a substantially flat plate having a plurality of apertures therethrough disposed transverse to the general direction of flow of the air-exhaust gas mixture, said plate having an area substantially equal to one-half the area of the exhaust port of said engine, said combustion stabilizing means being separate and independent of said air introduction means and located adjacent to said exhaust ports and entirely downstream of said air introduction means, for stabilizing the combustion of the air-exhaust gas mixture which occurs in the region of said exhaust ports during the warm-up period of the engine's operation and prior to the warm-up of a reactor means located downstream of said combustion stabilizing means, thereby providing, during said warm-up period, reduced levels of unburned contaminants emitted into the atmosphere and rapid warm-up of the reactor means; and c. reactor means, located downstream of said combustion stabilizing means for oxidizing any uncombusted air-exhaust gas mixture.

2. An assembly for reducing the level of contaminants in exhaust gases emitted from the exhaust ports of an internal combustion engine containing a fuel enrichment device for increasing the fuel:air ratio in the engine during the warm-up period of the engine's operation which comprises:

a. means for introducing air to said exhaust ports to mix with said exhaust gases;

b. combustion stabilizing means, separate and independent of said air introduction means and located adjacent to said exhaust ports and entirely downstream of said air introduction means, for stabilizing the combustion of the air-exhaust gas mixture which occurs in the region of said exhaust ports thereby providing, during said warm-up period, reduced levels of unburned contaminants emitted into the atmosphere and rapid warm-up of reactor means located downstream of said combustion stabilizing means; and c. reactor means, located downstream of said combustion stabilizing means, for combusting any uncombusted air-exhaust gas mixture, said reactor means comprising wall means defining a generally annular combustion chamber having inner and outer boundaries, exhaust inlet means defined in the wall means comprising the outer boundary of said chamber, said inlet means being disposed to tangentially introduce said air-exhaust gases mixture into said combustion chamber, and exhaust outlet means defined in the wall means comprising the inner boundary of said chamber, said exhaust outlet being positioned and proportioned relative to said inlet means so that the exhaust gases leaving the reactor through said exhaust outlet means are substantially completely combusted.

3. The assembly of claim 1 in which the reactor comprises wall means defining a generally circular combustion chamber and including a pair of generally opposite end walls, exhaust inlet means defined in said wall means and being disposed to tangentially introduce the exhaust gases into said combustion chamber, and exhaust outlet means defined in one of said end walls, said exhaust outlet means being of a size substantially less than the size of the end wall containing said exhaust outlet means and being positioned and proportioned relative to said inlet means so as to thereby create within said combustion chamber a recirculation of at least a portion of the combusted exhaust gases with fresh exhaust gases entering through said inlet means, prior to exit of the combusted exhaust gases through said exhaust outlet means.

4. The assembly of claim 1 which (a) includes nitrogen oxides reducing catalyst means located downstream and adjacent to some, but not all of the exhaust ports, (b) the air introduction means are constructed in a manner such that air is not introduced to those exhaust ports which are adjacent said catalyst means, and (c) there are no combustion stabilizing means adjacent to those exhaust ports which are adjacent to said catalyst means.

5. The assembly of claim 1 in which the reactor means comprises wall means defining a generally annular combustion chamber having inner and outer boundaries, exhaust inlet means defined in the wall means comprising the outer boundary of said chamber, said inlet means being disposed to tangentially introduce said air-exhaust gases mixture into said combustion chamber, and exhaust outlet means defined in the wall means comprising the inner boundary of said chamber, said exhaust outlet being positioned and proportioned relative to said inlet means so that the exhaust gases leaving the reactor through said exhaust outlet means are substantially completely combusted.

6. The assembly of claim 5 in which the reactor means contains end plate means extending across the inner boundary of said combustion chamber to form a downstream plenum chamber for the gases leaving the reactor means through said exhaust outlet means.

7. The assembly of claim 5 which includes thermal means responsive to the temperature of the reactor means and operatively connected to fuel enrichment device that the fuel:air ratio in said engine increases and decreases, as said temperature decreases and increases, respectively.

8. The assembly of claim 5 in which the combustion chamber has a toroidal configuration.

9. The assembly of claim 8 in which the engine contains fuel introduction means and throttle plate means and the assembly includes means for recycling a portion of effluent from the reactor means back to an intake of the engine at a point intermediate that of the fuel introduction means and the throttle plate means of said engine.

10. The assembly of claim 5 in which the combustion chamber has a generally cylindrical configuration and the exhaust outlet has a long dimension which is oriented in the direction of the central axis of the combustion chamber.

11. The assembly of claim 10 in which the engine contains fuel introduction means and throttle plate means and the assembly includes means for recycling a portion of effluent from the reactor means back to an intake of the engine at a point intermediate that of the fuel introduction means and the throttle plate means of said engine.

12. The assembly of claim 1 in which the engine contains fuel introduction means and throttle plate means and the assembly includes means for recycling a portion of effluent from the reactor means back to an intake of the engine at a point intermediate that of the fuel introduction means and the throttle plate means of said engine.

13. An improved reactor for combusting exhaust gases comprising wall means defining a generally annular combustion chamber having inner and outer boundaries, exhaust inlet means defined in the wall means comprising the outer boundary of said chamber, said inlet means being disposed to tangentially introduce said exhaust gases into said combustion chamber, and exhaust outlet means defined in the wall means comprising the inner boundary of said chamber, said exhaust outlet means being positioned and proportioned relative to said inlet means so that the exhaust gases leaving the reactor through said exhaust outlet means are substantially completely combusted.

14. The reactor of claim 13 which contains end plate means extending across the inner boundary of said combustion chamber to form a downstream plenum chamber from the gases leaving the reactor through said exhaust outlet means.

15. The reactor of claim 13 in which the combustion chamber has a toroidal configuration.

16. The reactor of claim 13 which includes nitrogen oxides reducing catalyst means located upstream of said exhaust inlet means.

17. The reactor of claim 13 in which the combustion chamber has a generally cylindrical configuration and the exhaust outlet has a long dimension which is oriented in the direction of the central axis of the combustion chamber.

18. An assembly for reducing the level of contaminants in exhaust gases emitted from the exhaust ports of an internal combustion engine which comprises:
   a. conduit means communicating with each exhaust port and a reactor means;
   b. means for introducing air to mix with said exhaust gases;
   c. said reactor means comprising wall means defining a generally annular combustion chamber having inner and outer boundaries, exhaust inlet means defined in the wall means comprising the outer boundary of said chamber, said inlet means being disposed to tangentially introduce said air-exhaust gases mixture into said combustion chamber, and exhaust outlet means defined in the wall means comprising the inner boundary of said chamber, said exhaust outlet being positioned and proportioned relative to said inlet means so that the exhaust gases leaving the reactor through said exhaust outlet means are substantially completely combusted.

19. The assembly of claim 18 in which the reactor means contains end plate means extending across the inner boundary of said combustion chamber to form a downstream plenum chamber from the gases leaving the reactor through said exhaust outlet means.

20. The assembly of claim 18 in which the combustion chamber has a toroidal configuration.

21. The reactor of claim 18 in which the combustion chamber has a generally cylindrical configuration and the exhaust outlet has a long dimension which is oriented in the direction of the central axis of the combustion chamber.

22. The assembly of claim 18 which includes nitrogen oxides reducing catalyst means located upstream of said air introduction means.

23. The assembly of claim 18 which includes (a) nitrogen oxides reducing catalyst means located upstream of the air introduction means and within only some of said conduit means; and (b) means for introducing air to those exhaust ports which are in communication with those conduit means which do not contain nitrogen oxides reducing catalyst means.

* * * * *